US009584606B2

(12) United States Patent
Kao et al.

(10) Patent No.: US 9,584,606 B2
(45) Date of Patent: Feb. 28, 2017

(54) LOCATION SUGGESTION BASED UPON SOCIAL NETWORKING POST CONTENT

(71) Applicant: Facebook, Inc., Menlo Park, CA (US)

(72) Inventors: Wayne Kao, New York, NY (US); Gregory Paul Whalin, Brooklyn, NY (US); Jan Kodovsky, Rochester, NY (US)

(73) Assignee: FACEBOOK, INC., Menlo Park, CA (US)

( * ) Notice: Subject to any disclaimer, the term of this patent is extended or adjusted under 35 U.S.C. 154(b) by 238 days.

(21) Appl. No.: 14/292,055

(22) Filed: May 30, 2014

(65) Prior Publication Data

US 2015/0350349 A1 Dec. 3, 2015

(51) Int. Cl.
 G06F 15/16 (2006.01)
 H04L 29/08 (2006.01)
 G06Q 50/00 (2012.01)
 G06Q 30/02 (2012.01)

(52) U.S. Cl.
 CPC ......... *H04L 67/18* (2013.01); *G06Q 30/0261* (2013.01); *G06Q 30/0282* (2013.01); *G06Q 50/01* (2013.01)

(58) Field of Classification Search
 CPC .......... H04L 67/10; H04L 67/18; H04W 4/02; G06Q 60/01; G06Q 30/0261; G06Q 30/0282; G06Q 50/01
 See application file for complete search history.

(56) References Cited

U.S. PATENT DOCUMENTS

| 8,370,062 B1* | 2/2013 | Starenky ............... H04W 4/025 340/3.3 |
| 8,930,452 B2* | 1/2015 | Baalu ..................... G06Q 30/02 709/204 |
| 9,014,726 B1* | 4/2015 | Foster .................... H04W 4/02 455/418 |
| 9,262,540 B2* | 2/2016 | Sankar ................... G06Q 50/01 |
| 2007/0298812 A1* | 12/2007 | Singh ............... H04L 29/12122 455/456.1 |
| 2011/0238762 A1* | 9/2011 | Soni .................... G01C 21/3679 709/206 |
| 2012/0109836 A1* | 5/2012 | Chen ..................... G06Q 10/10 705/319 |
| 2012/0278387 A1* | 11/2012 | Garcia .................. G06Q 50/01 709/204 |

(Continued)

OTHER PUBLICATIONS

Vindu Goel, "With New App, Foursquare Strives to Be 'Magic' in Your Pocket," NYTimes.com, The New York Times Company, Aug. 29, 2013, 3 pages.

*Primary Examiner* — Jonathan Bui
(74) *Attorney, Agent, or Firm* — Nicholson De Vos Webster & Elliott LLP

(57) ABSTRACT

Exemplary methods, apparatuses, and systems receive input associated with a social networking system user account. The input includes content to be published to the social networking system. In response to the received input, one or more location suggestions are identified based upon the content. The one or more identified location suggestions are transmitted to a user device associated with the user account. Selection of a location suggestion is received. The content and selected location is published as a post within the social networking system.

21 Claims, 12 Drawing Sheets

(56) References Cited

U.S. PATENT DOCUMENTS

| | | | |
|---|---|---|---|
| 2013/0041653 A1* | 2/2013 | Tseng | G06Q 50/01 704/9 |
| 2014/0181205 A1* | 6/2014 | Sherrets | G06Q 50/01 709/204 |
| 2014/0187213 A1* | 7/2014 | Shuster | H04W 4/023 455/414.1 |
| 2014/0229856 A1* | 8/2014 | Lindsay | H04L 65/403 715/753 |

* cited by examiner

LOCATION SUGGESTION BASED UPON SOCIAL NETWORKING POST CONTENT

FIELD

The various embodiments described herein relate to publishing content to social networking systems. In particular, the embodiments relate to suggesting locations based upon content composed by or selected by a user for publication on a social network.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

Users of social networking systems increasingly access the social networking systems, and other network services, via mobile devices. Mobile devices are configured to receive user input, e.g., by way of a virtual keyboard or other selectable user interface objects displayed on the mobile device's touchscreen. Given the limits of these input mechanisms, users may limit their interactions with a social networking system via a mobile device when those interactions require manual entry of words or phrases. While predictive text capabilities attempt to auto-correct typographical errors for and reduce the amount of keystrokes needed to enter common words, predictive text algorithms do not account for information that is relevant to a specific user and social networking system.

SUMMARY OF THE DESCRIPTION

Exemplary methods, apparatuses, and systems receive input associated with a social networking system user account. The input includes content to be published to the social networking system. For example, a user of a mobile device may manually enter content describing the user's state of mind, activity, plans, etc. using a keyboard or select pre-composed content within a post composition window. In response to the received input, one or more location suggestions are identified based upon the content. For example, the social networking system may parse the content for keywords or pre-composed content and map the parsed content to one or more categories of locations. Additionally, the social networking system may refine location suggestions using location data for the mobile device, location data for the user, location history for the user, the time of post composition, feedback on locations, etc. One or more identified location suggestions are transmitted to a user device associated with the user account. In one embodiment, the location suggestion(s) are transmitted during the composition of the post. In an alternate embodiment, the location suggestion(s) are transmitted after the post has been published to the social networking system. Upon user selection or confirmation of a location suggestion, the content and selected location are published as a part of a post within the social networking system.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Users of a social networking system share content by posting electronic messages to the social networking system. For example, posts may include content describing a state of mind, plans, activity, etc., and include a location that is relevant to that content. The inclusion of additional data, such as a location, however, can be inconvenient when a user composes the post on a mobile device. Accordingly, embodiments described herein enable the automatic identification and transmittal of selectable location suggestions. As a result, users of the social networking system benefit from the ability to share online content while minimizing the amount of user input involved in composing the post. Additionally, users in a dense metropolitan area are able to select among relevant location suggestions without being subjected to the "noise" of all of the locations within close proximity to an estimated user location.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Additionally, as used herein, the term "exemplary" refers to embodiments that serve simply as an example or illustration. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
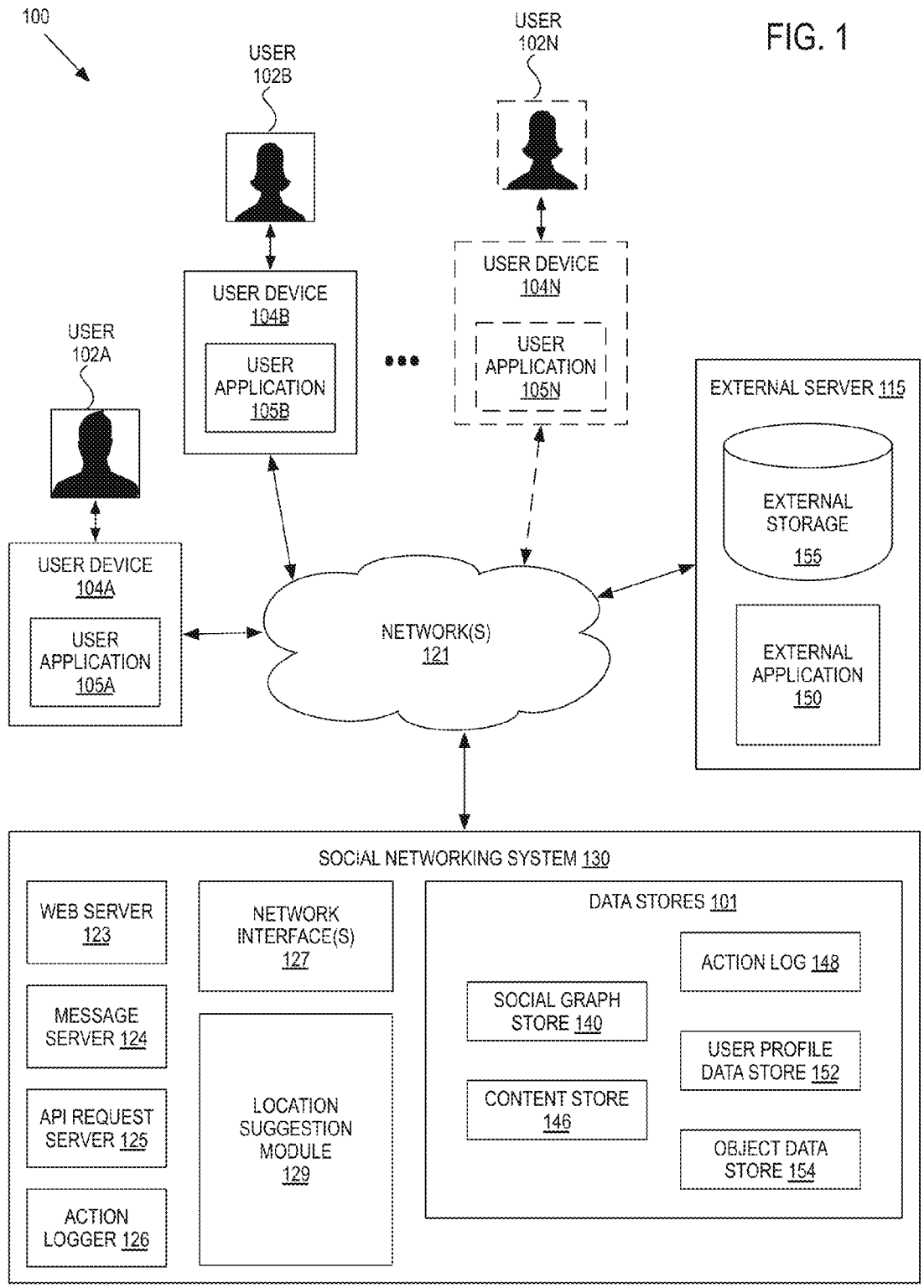
FIG. 1 illustrates an exemplary network environment of a system, including a social networking system, to suggest locations based upon post content.

FIG. 1 illustrates an exemplary network environment of a system 100 including a social networking system 130 that offers users 102A-102N the ability to communicate and interact with other users 102A-102N and entities of the social networking system 130 according to an embodiment of the invention. The user devices 104A-104N are enabled to interact with social networking system 130 and can be any type of computing device capable of receiving user input as well as transmitting and/or receiving data via a network (e.g., network(s) 121). Exemplary user devices 104A-104N include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application. In an embodiment, the user application 105A is a special-purpose client application (e.g., Facebook for iPhone or iPad, etc.), and in an embodiment the user application 105A is the native operating system of the user device 104A, such as Windows®, Mac OSX®, iOS®, or ANDROID™, which may utilize an Application Programming Interface (API) to directly interface with the social networking system 130 through API request server 125.

The user devices 104A-104N are configured to communicate with the social networking system 130 via a network 121 or collection of networks, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In some embodiments, the social networking system 130 comprises one or more computing devices storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a movie, food, etc.

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, one embodiment of the social networking system 130 includes an API request server 125, a web server 123, a message server 124, an action logger 126, and a set of data stores 101. This embodiment also includes, within the data stores 101, a social graph store 140, a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images, videos, and location data provided by the user may also be stored within the user profile. In other embodiments, only textual data of the user is stored in the user profile and other data (e.g., images, videos, etc.) are stored in multimedia stores and associated with the user (e.g., through associating a user identifier of the user with an image/video identifier of the multimedia content). In certain embodiments, images, videos, and posts by users including or depicting one or more other users of the social networking system 130 may be "tagged" with identification information of those users. A user profile in the user profile data store 152 may also maintain references to actions (stored in the user profile or in an action log 148) by the corresponding user performed on content items in a content store 146. A user may also specify one or more privacy settings, which are stored in that user's user profile.

Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting webpages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a "post." In some embodiments, a user can send a private message to another user that can only be retrieved by the other user.

When a user takes an action within the social networking system 130, an action logger 126, subject to any privacy settings and restrictions of the user and/or social networking system 130, may record the action in an action log 148. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., posts, images, videos) associated with or created by the other user, attending an event posted by another user, being tagged in posts or photos with/by another user, etc. In some embodiments, certain actions are described in connection with more than one user, and these actions may be associated with those users as well and stored in the action log 148.

Users may interact with various objects on the social networking system 130, including commenting on posts, sharing links, and checking-in to physical locations via a mobile device, accessing content items in a sequence or other interactions. As used herein, "checking-in" refers to the inclusion of a location within a post as an indication, e.g., that the user was present at that location. As used herein, a "location" refers to a business, residence, public place, or other location that may be identified/represented within the social network. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, the social networking system 130 includes a location suggestion module 129. The location suggestion module 129 identifies location suggestions based upon post content as described herein. For example, the location suggestion module 129 may parse the content for keywords or pre-composed content and map the parsed content to one or more categories of locations. Additionally, the location suggestion module 129 may refine location suggestions using location data for the mobile device, location data for the user, location history for the user, the time of post composition, feedback on locations, etc. While embodiments described herein refer to method(s) of location suggestion being performed by the location suggestion module 129 within the social networking system 130, all or part of the method(s) (e.g., method 300) may be performed by an external application 150 running on an external server 115.

Figure 2:
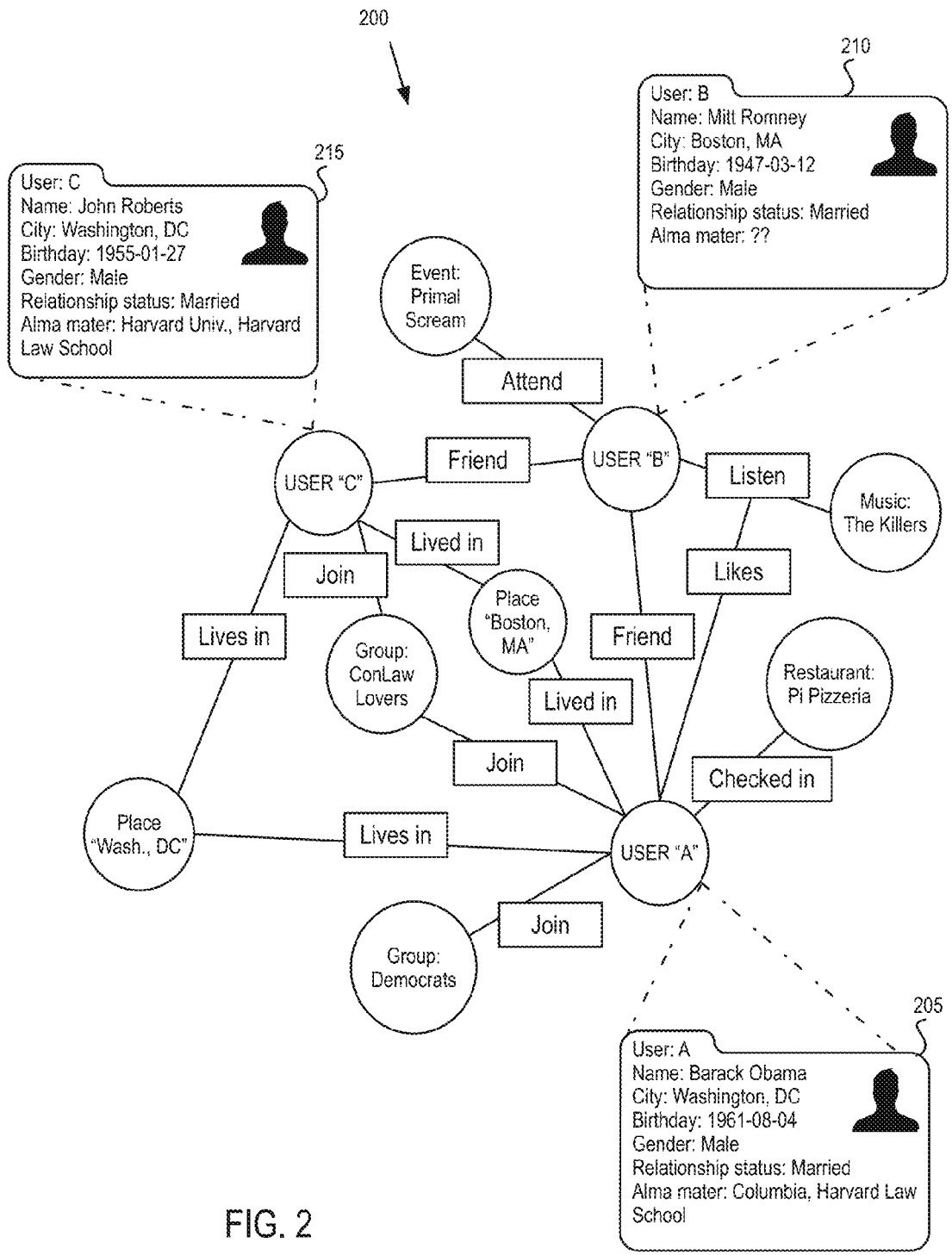
FIG. 2 illustrates an exemplary graph of social network data used to suggest locations based upon post content.

FIG. 2 illustrates exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, checked in at Pi Pizzeria in St. Louis, Mo., and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, users may select privacy settings to control what network service data is shared, with whom the data is shared, and/or what data used for selecting candidate objects.

Figure 3:
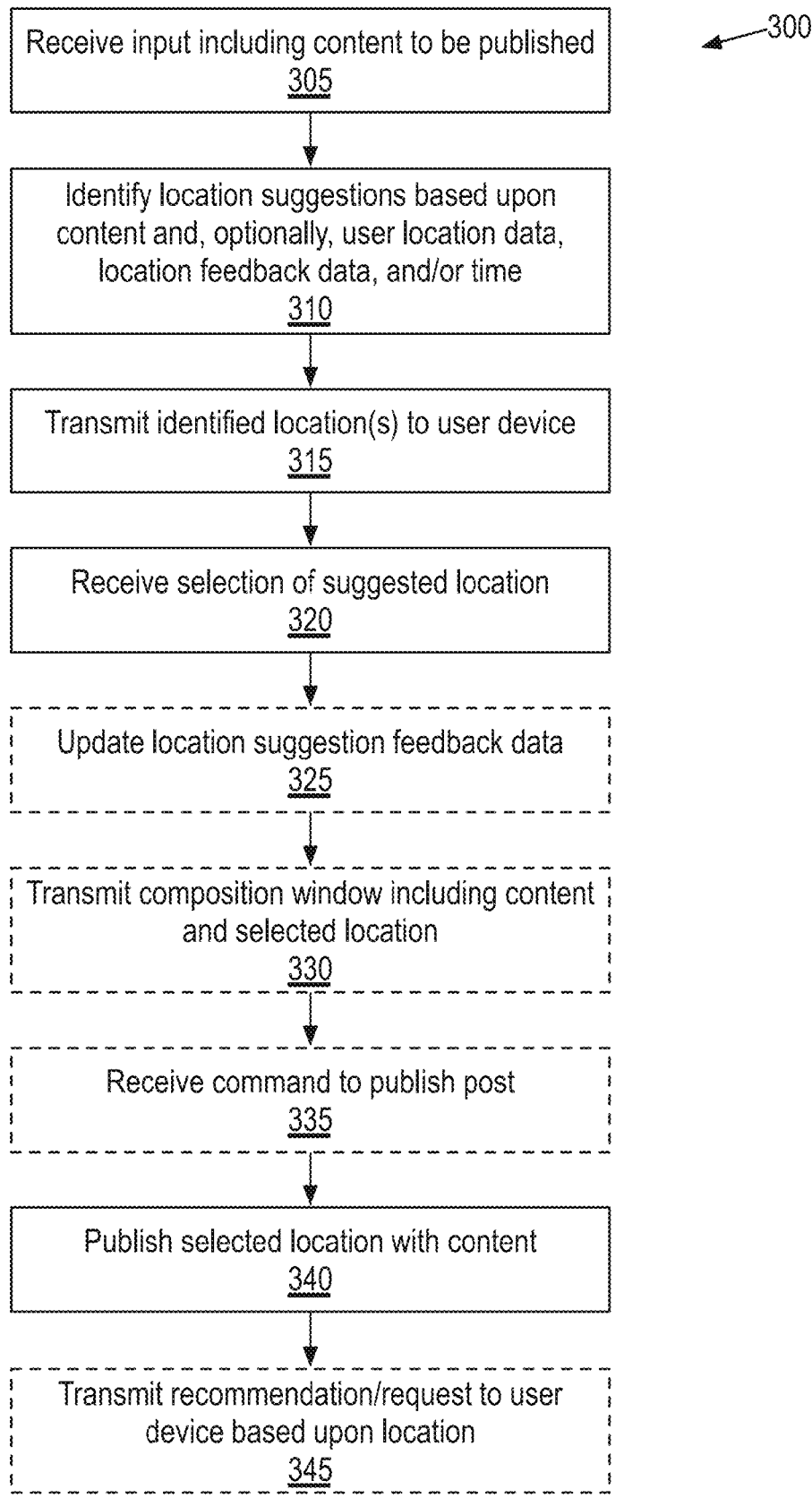
FIG. 3 is a flow chart illustrating an exemplary method to suggest locations based upon post content.

FIG. 3 is a flow chart illustrating an exemplary method 300 to suggest locations based upon post content. At block 305, the social networking system receives input including content to be published to a post. For example, a user may enter content within a post composition window or via a third-party application to indicate how the user is feeling, what the user is watching, reading, listening to, drinking, eating, playing, that the user is traveling, etc. In one embodiment, the content is entered by the user manually typing out words or phrases using a keyboard (physical or virtual). In another embodiment, the user selects pre-composed content, e.g., by "clicking" on words, phrases, or images representing the content to be published. Exemplary pre-composed content is described with reference to FIGS. 4-5. In yet another embodiment, the user performs a combination of manually typing out content and selecting pre-composed content. As described above, the user entering content may also tag other users in the content such that the social networking system associates the content with both the user creating the post and the one or more tagged users. In one embodiment, the post content does not include location data. For example, the content may exclude the name of a location at which the user is watching something, reading something, listening to something, drinking something, eating something, playing something, etc.

At block 310, the social networking system identifies location suggestions based upon the post content. The post content may be utilized for identifying location suggestions before or after the content is published by the social networking system. In one embodiment, the social networking system parses the content for keywords or pre-composed content and maps the parsed content to one or more categories of locations. For example, content related to watching a movie may map to a movie theater location category, content related to reading may map to bookstore and library location categories, content related to eating may map to a restaurant location category, etc. Additionally, content related to drinking coffee may map to cafes while content related to drinking a cocktail may map to bars. In one embodiment, the parsing includes text normalization, stemming, and other methods of identifying content within text. The identified content is mapped, e.g., using a stored data structure, to the location categories. In another embodiment, user selection of pre-composed content maps directly to location categories without further analyzing text by way of normalization, stemming, etc.

In one embodiment, the social networking system's identification of location suggestions is further based upon user location data, location feedback data, and/or time of post composition. For example, user location data may include location data transmitted by the user's device in the form of Global Positioning System (GPS) or Assisted GPS (A-GPS) data, Wi-Fi positioning data, cellular network triangulation data, etc. User location data may also include user profile location data, such as an indicated location of home, work, school, etc. Furthermore, user location data may include locations the user previously included in posts or locations included in posts by other users that also tag the user.

In an embodiment in which location suggestions are identified after the content is published by the social networking system, unpublished user location data (e.g., GPS data) is saved by the social networking system in association with the published post. For example, the location data may be saved using a time stamp that matches the post, stored as metadata along with the post, or otherwise mapped to the post.

In one embodiment, the user (via a mobile device) continuously shares user location data (e.g., at a predetermined time interval) with the social networking system. In such an embodiment, the social networking system determines from the user location data if the user remained in particular location or within a particular radius of a location for a threshold period of time. For example, the social networking system may determine from location data indicating that a user stopped at a particular location for more than fifteen minutes that a business at that location is a likely location candidate.

In one embodiment, each identified location is ranked or otherwise attributed a score based upon a distance from the user location data. For example, the closer a location is to the user's GPS location at the time of the post, the more likely the user is composing/composed a post related to a business, residence, public place, etc. at that location. Similarly, a location's proximity to the user's work during work hours may be attributed a higher score than a location near the user's home.

Exemplary location feedback data includes the individual user or other users confirmation(s) or rejection(s) of locations when presented as suggested locations. Additionally, location feedback data may include how often a location is included posts, whether the user has "liked," "follows," left a positive rating for, or has created another relationship to the location in the social graph, and/or a number of "likes" or other positive ratings for a location generally.

In one embodiment, location feedback data may be weighted, giving the highest priority to feedback by the user, less priority to feedback by the user's connections within the social network (e.g., with the score being based upon affinity to the user), and even less priority to feedback by other users that are not connected to the user (e.g., with the score being based upon similarities between the other users and the current user).

The social networking system may further refine identified locations based upon the time of the post. As described above, a location's proximity to the user's work during work hours may be attributed a higher score than a location near the user's home. Additionally, while a bar may serve food, a bar may be given a higher score after work hours and a lower score during work hours. Similarly, a restaurant may be given a higher score for post content about drinking a cocktail during the early evening while a bar may be given the higher score in the late evening. Furthermore, the social networking system may determine hours of operation for locations (e.g., based upon an entity profile or external link) and include/exclude locations based upon whether or not the location is open for business at the time of the post.

In one embodiment, the social networking system uses the (combined) scores for each location to order the location suggestions. Additionally, the social networking system may select only those locations with a score above a threshold value. Alternatively, the social networking system may select only a threshold number of locations with the highest score. For example, the social networking system may present only a single, highest scoring location suggestion to the user.

At block 315, the social networking system transmits the one or more identified location suggestions to the user device. In one embodiment, the one or more identified location suggestions are transmitted as a part of a graphical user interface to be displayed to the user by the user device. Exemplary graphical user interfaces including the transmitted location suggestions are described with reference to FIGS. 6 and 9.

At block 320, the social networking system receives selection (or rejection) of a suggested location. For example, the user may "click" or otherwise select to include or reject a location suggestion displayed within a graphical user interface. Exemplary graphical user interfaces implementing the selection of a location suggestion (and the transmittal to the social networking service) are described with reference to FIGS. 6 and 9.

At block 325, the social networking service optionally updates the location suggestion feedback data for the one or more location suggestions transmitted to the user device. For example, user selection of a location suggestion serves as positive feedback, which the social networking system may use to increase the confidence score for suggesting that particular location. The lack of selection or active rejection of a suggested location may also be used as negative feedback. For example, the suggested location(s) may or may not accurately predict the user's actual location/location related to the content of the post. Alternatively, the user may choose not to include location data despite a location suggestion accurately predicted the user's location. Given these scenarios, the social networking system may decrease the confidence score for suggesting a particular location in a corresponding amount when a suggested location is not selected or a suggested location is rejected and another suggested location is selected/entered.

At block 330, the social networking system optionally transmits a composition window including the content and the selected location. For example, the social networking system may transmit the content and selected location within the context of a graphical user interface to provide a draft or preview of the post. In one embodiment, the graphical user interface further allows the user to edit the content of the post, e.g., to add further content, tag another user, add a picture, etc. An exemplary graphical user interface including the content and selected location for preview/editing is described with reference to FIG. 7. Alternatively, the social networking system publishes the post including the content and selected location in response to the selection of the location suggestion.

At block 335, the social networking system optionally receives a command to publish the post including the content and selected location. For example, once the user has previewed/edited the draft post, the user selects a graphical user interface object or otherwise enters a command to the social networking system to publish the post. An exemplary graphical user interface enabling a user to submit a command to publish the content and selected location is described with reference to FIG. 7.

At block 340, the social networking system publishes the post including the selected location and content. In one embodiment, the selected location is published along with a map, as a link to a webpage for the location, or in another format to indicate that the text refers to a location. An exemplary graphical user interface displaying the published post including the content and selected location is described with reference to FIG. 10.

At block 345, the social networking system optionally transmits a recommendation or request to the user device based upon the selected location. In one embodiment, the recommendation or request enables the user to join a local chat based upon social networking system users present at the selected location at that time. For example, the social networking system may facilitate a local chat room/conversation for all users that have checked-in at a restaurant or bar. In one embodiment, the local chat is open to all social networking system users present or that checked-in at the location within a threshold period of time. Alternatively, only users with a threshold number of degrees of connectivity to a user already participating in the chat are able to join the chat. An exemplary graphical user interface presenting a recommendation or request enabling a user to join a local chat is described with reference to FIG. 11.

In one embodiment, the recommendation or request transmitted to the user prompts the user to share additional content related to the location. For example, the content of the post may include commentary that may be considered to be a review of the location that would be helpful to share publicly by adding it to a webpage dedicated to the location. Alternatively, the content may include a picture taken at the location that may users may find interesting when looking up the location within the social networking system. Additionally, the user may have taken a picture at the location at the time the post was composed and uploaded the picture to the social networking system but not included the picture within the post. In such an embodiment, the social networking compares metadata included with uploaded picture, such as location data and/or a time stamp, and compares the metadata with the location data for the selected location or the time of the creation of the post. If the social networking system determines that the picture metadata is within a threshold time/location distance of the post metadata, the social networking system prompts the user to add the picture to the post or to share the picture publicly (e.g., by adding it to an album for the location).

Figure 4:
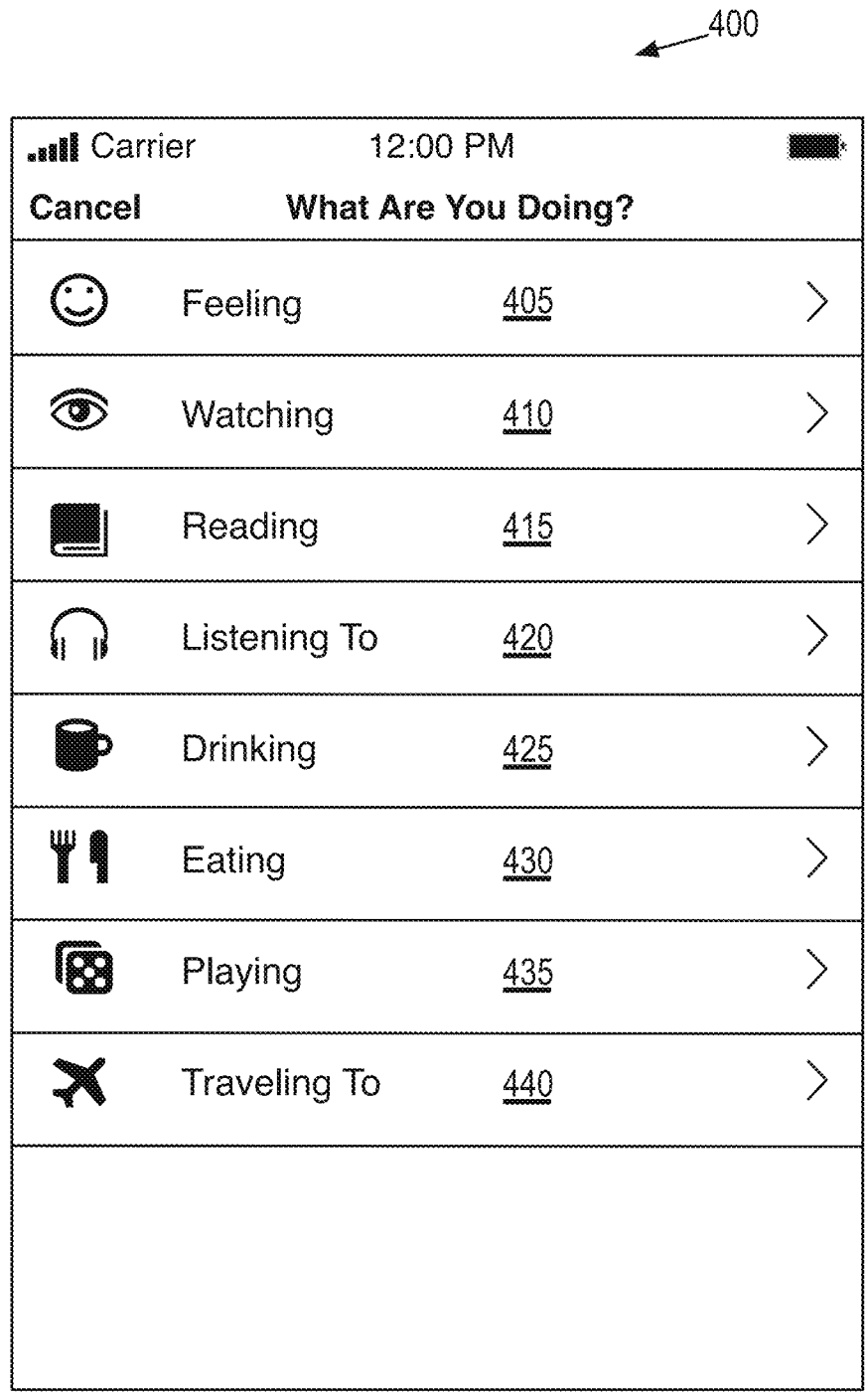
FIG. 4 is an exemplary user interface illustrating selectable post content used to suggest locations based upon post content.

FIG. 4 is an exemplary user interface 400 illustrating selectable pre-composed content used to suggest locations based upon post content. For example, user interface 400 includes selectable user interface objects for a user to compose a post about how the user is feeling 405, what the user is watching 410, what the user is reading 415, to what the user is listening 420, what the user is drinking 425, what the user is eating 430, what the user is playing 435, or to where the user is traveling 440. Other pre-composed content (not shown) may also be included in user interface 400. For the purpose of providing an example, FIG. 5 will be described based upon the user selection of eating 430. Alternatively, the content is entered manually as described herein.

Figure 5:
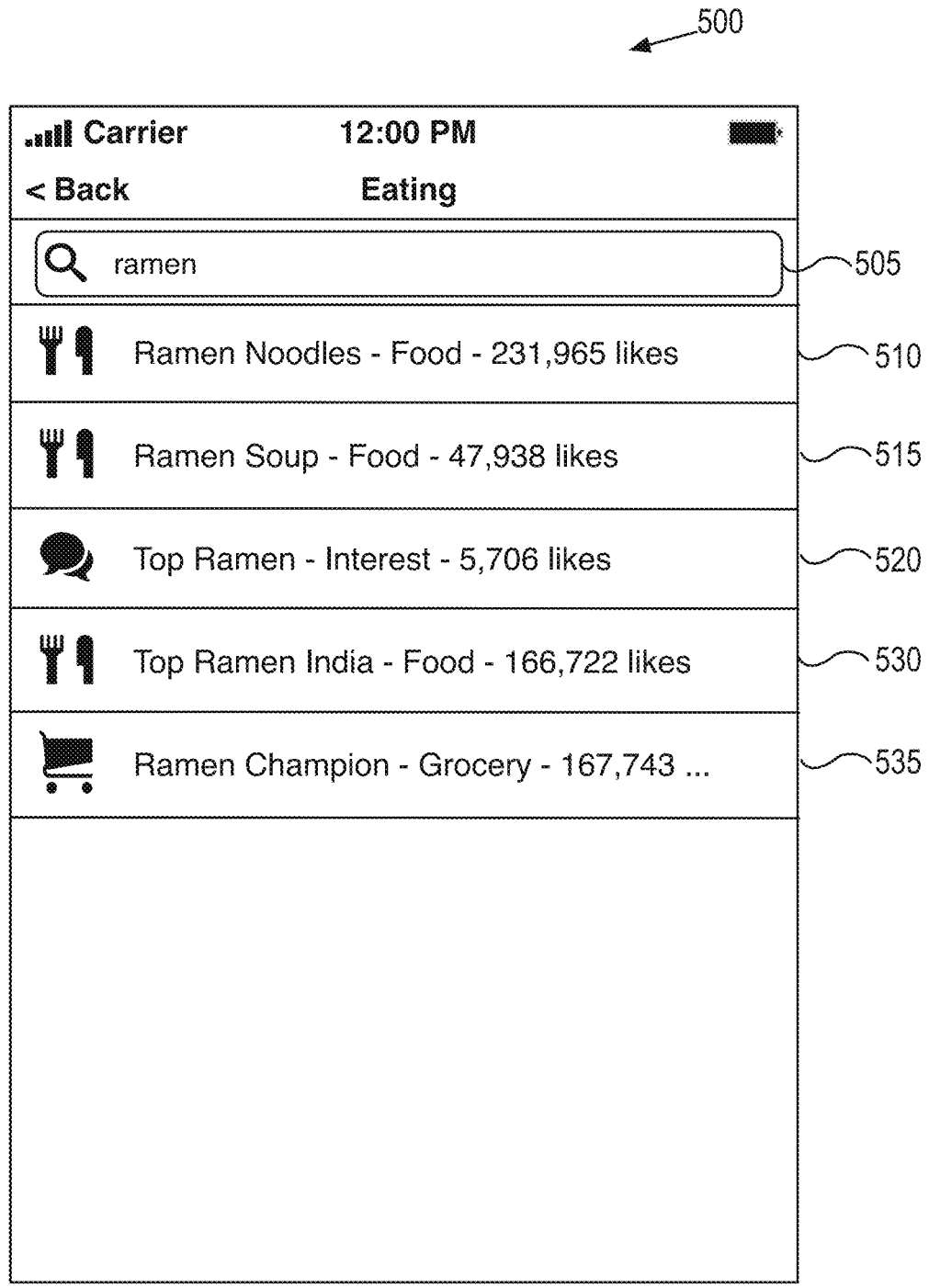
FIG. 5 is an exemplary user interface illustrating selectable post content used to suggest locations based upon post content.

FIG. 5 is an exemplary user interface 500 illustrating selectable post content used to suggest locations based upon post content. User interface 500 includes one or more suggestions for what the user is eating. For example, eating suggestions may be based upon popularity, user history, etc. Additionally, the user may enter text in a search box 505 and one or more suggestions 510-535 are presented in response to the text as entered by the user. In user interface 500, the user entered "ramen" in search box 505. As a result, the social networking system transmitted for display within user interface 500 suggestions 510-535 that resulted from a search for "ramen." In one embodiment, the search is limited to content within the social networking system (e.g., object nodes). Alternatively, the search extends to a search of the World Wide Web and the recommended content is based upon corresponding search results. For the purpose of providing an example, FIG. 6 will be described based upon the user selection of Ramen Noodles 510. Alternatively, the content is entered manually as described herein.

Figure 6:
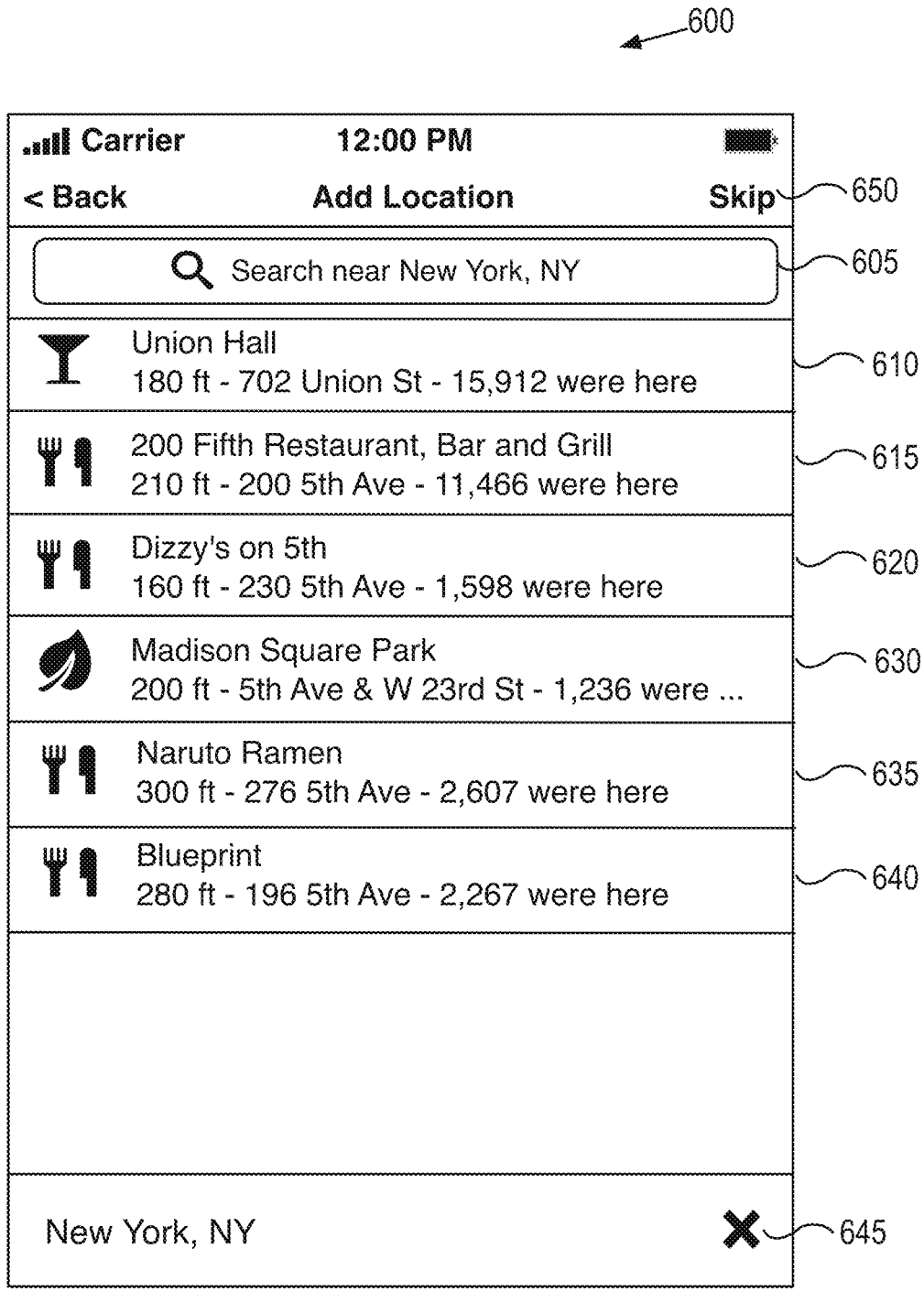
FIG. 6 is an exemplary user interface illustrating suggested locations based upon post content.

FIG. 6 is an exemplary user interface 600 illustrating suggested locations based upon post content. For example, user interface 600 includes location suggestions 610-640 identified based upon the selection of pre-composed content indicating that the user is eating ramen noodles. For example, the social networking system maps "eating ramen noodles" to one or more categories of locations that serve food or, in particular, ramen noodles. Exemplary categories include restaurants, bars, and other venues that serve food. Additionally, the social networking system may map "eating ramen noodles" to locations in which the user may carry out/prepare food. For example, the user may be eating ramen noodles at a residence (e.g., the user's home or another persons home), at a public place (e.g., the user may be having a picnic at a park), etc.

Furthermore, as described above, the social networking system may identify location suggestions based upon proximity to an estimated user location based upon user location data, location feedback data, and time of the post. For example, Union Hall 610 includes an indication of 15,912 user check-ins that may be used as a strong indication of positive location feedback. Additionally, Union Hall 610 includes an indication that it is 180 feet from an estimated user location. Given the close proximity and positive feedback data, Union Hall 610 is presented as a suggested location.

In one embodiment, the user manually enters user location data. For example, user interface 600 includes search box 605 in which the user may enter location data. In the illustrated example, the search box 605 has been pre-filled with the city New York, N.Y. as a result of estimated user location data (e.g., based upon GPS data from the user's mobile device). The user may clear or otherwise alter the input of search box 605 to refine the suggested locations. For example, the user may delete the contents of search box 605 or select a user interface object 645 to clear the current location data. Additionally, the user may select a "skip" user interface object 650 to forgo the inclusion of a location within the post. As described above, the user inputs received in response to the displayed list of location suggestions may be used as positive and/or negative feedback.

Figure 7:
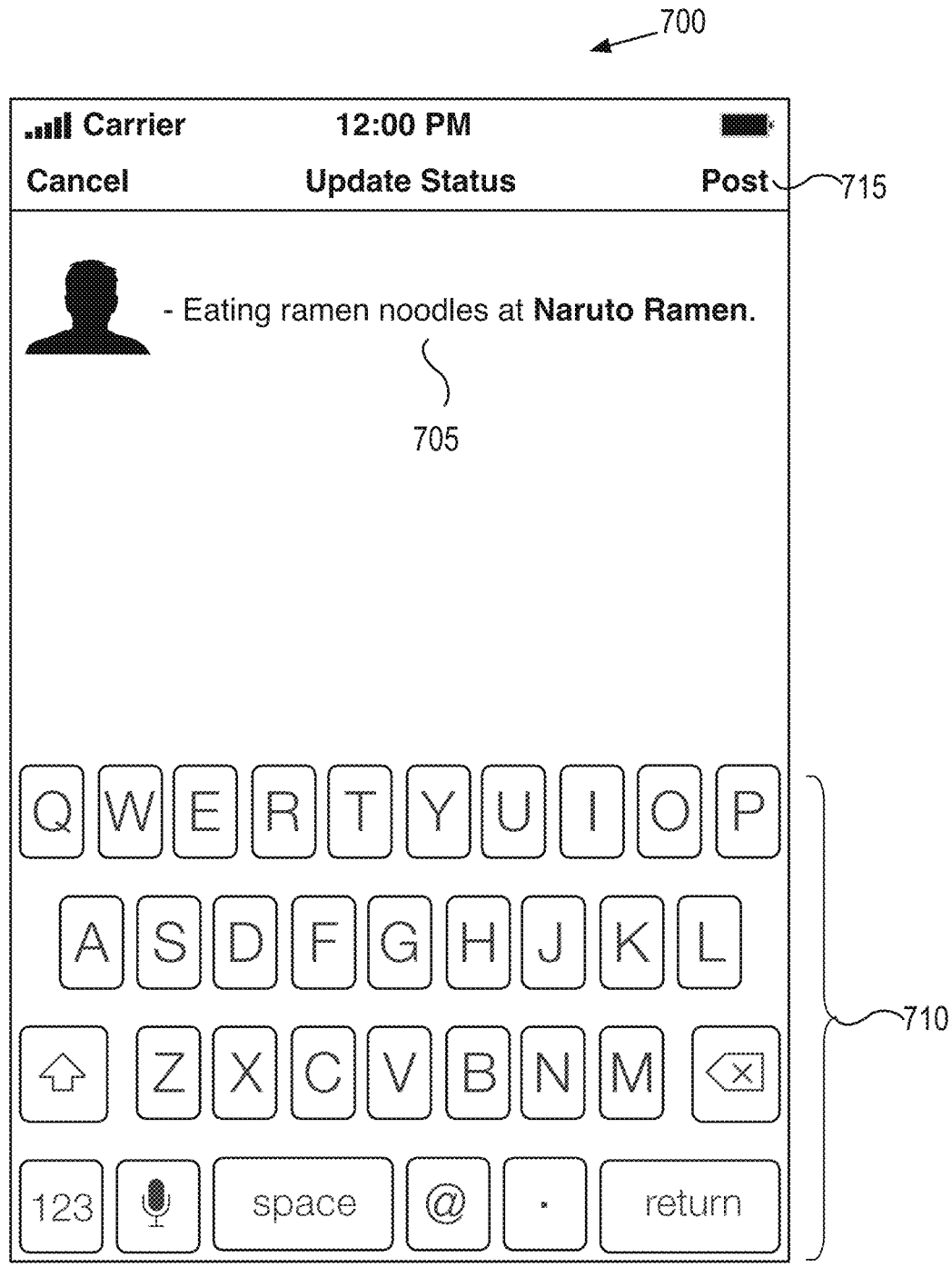
FIG. 7 is an exemplary user interface illustrating a selected location and post content.

FIG. 7 is an exemplary user interface 700 illustrating a selected location and post content. For the purpose of providing an example, FIG. 7 will be described based upon the user selection of Naruto Ramen 635. As a result of the selection user interface includes pre-composed content and location in the form of the text phrase "Eating ramen noodles at Naruto Ramen" 705. The selected location, Naruto Ramen, is illustrated in a bold typeface to indicate that the posted location will serve as a link to a webpage for the restaurant Naruto Ramen. Additionally, as described herein, the inclusion of a location may further include an image, map, or other data to demonstrate or illustrate the location within the post. The user interface 700 provides a draft of the post that the user may preview, edit using a keyboard 710, and/or publish 715.

Figure 8:
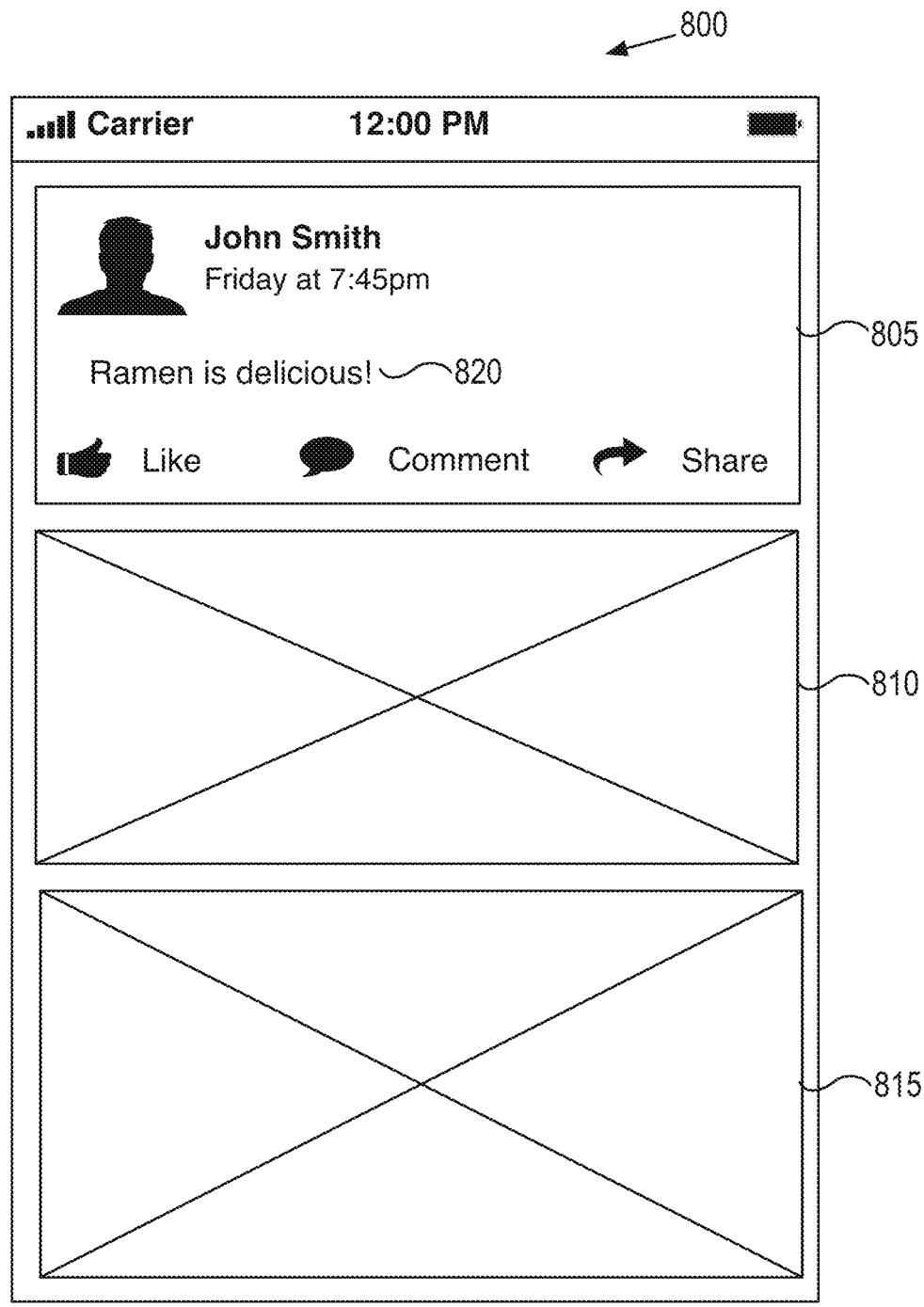
FIG. 8 is an exemplary user interface illustrating a published post used to suggest locations based upon post content.

FIG. 8 is an exemplary user interface 800 illustrating a published post 805 used to suggest locations based upon post content. User interface 800 illustrates a "news feed" including a user's published post 805 and other posts 810 and 815. Similar to the description above, the social networking system parses or otherwise utilizes post content 820 to identify one or more location suggestions. For example, the social networking system may determine that the combination of "ramen" and "delicious" in a sentence indicates that the content refers to the user eating ramen.

Figure 9:
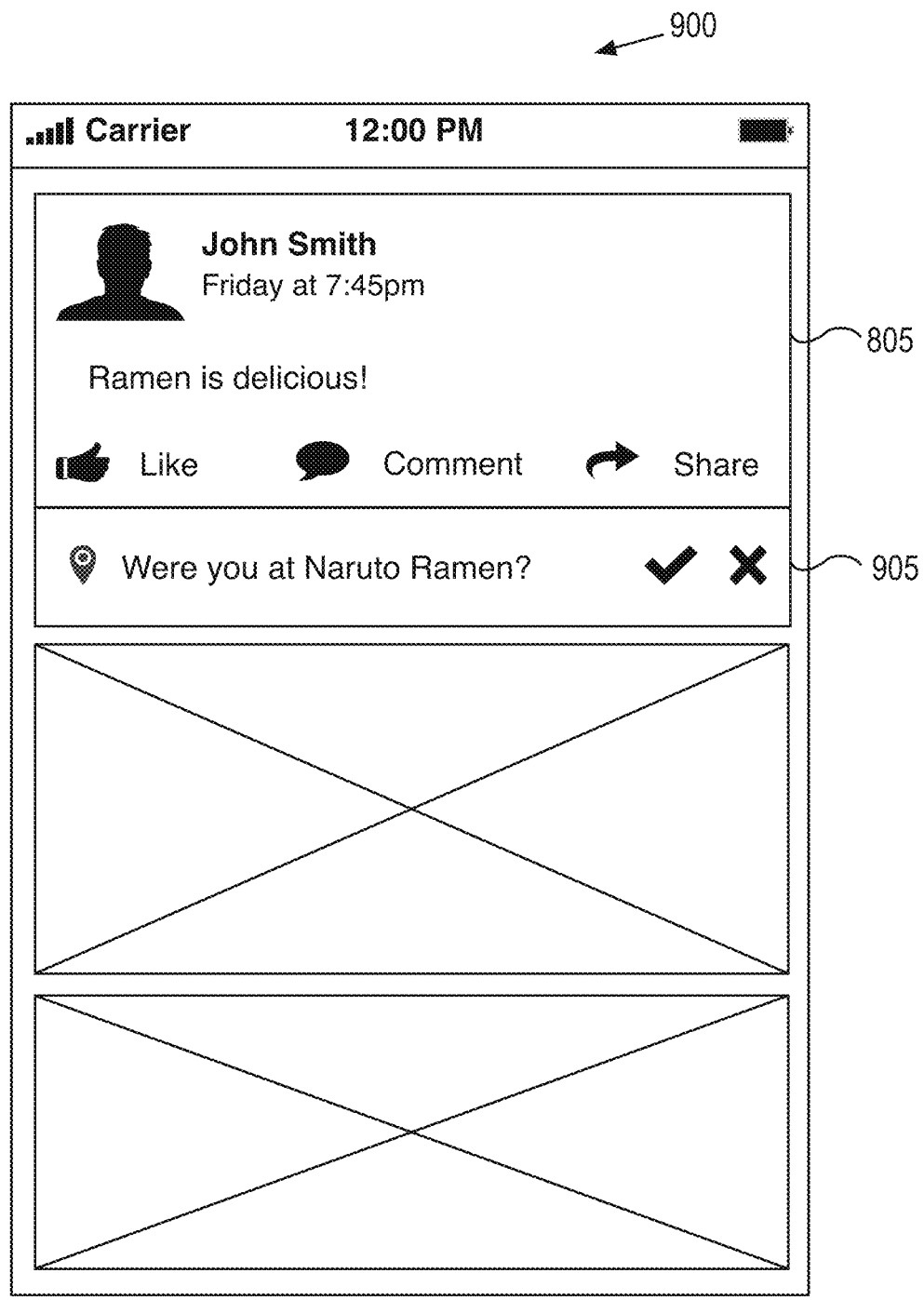
FIG. 9 is an exemplary user interface illustrating a suggested location based upon the post content.

FIG. 9 is an exemplary user interface illustrating 900 a suggested location based upon the published post content 820. For example, based upon user location data, location feedback data, and/or time data (e.g., location at the time of the post, the user being tagged in another user's post that includes a location, user check-in history, etc.), the social networking system alters published post 805 in the user's news feed to include a location query 905. The location query 905 requests that the user confirm or deny that the user was at or the post is otherwise associated with an identified location, Naruto Ramen. While illustrated as being attached to the published post 805, the location query 905 may be presented to the user in a location adjacent to the news feed or in a separate message. The user's selection of a user interface object within the location query 905 provides location feedback data and, if the location is confirmed, enables the social networking system to add the location to the post 805.

Figure 10:
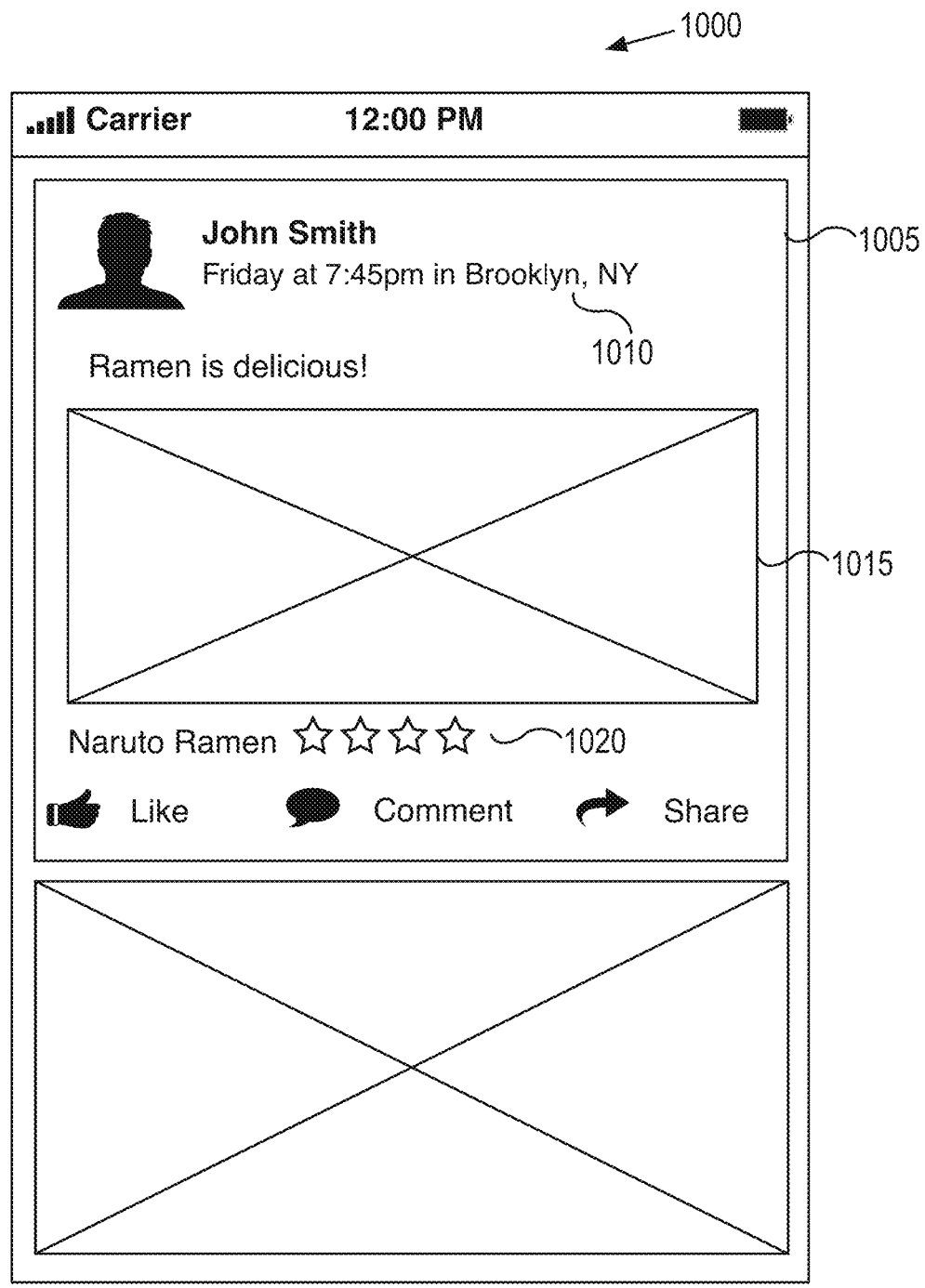
FIG. 10 is an exemplary user interface illustrating the addition of a selected location suggestion to the post content.

FIG. 10 is an exemplary user interface 1000 illustrating the addition of a selected location suggestion to the post content. Post 1005 is an example of the result of modifying post 805 to include the selected location. The addition of the selected location resulted in a general location 1010, e.g., in the form of a city and state being included in the post 1005. Furthermore, the addition of the selected location resulted in the inclusion of a map or image 1015 corresponding to the location as well as an indication of the location name and user rating/feedback 1020.

Figure 11:
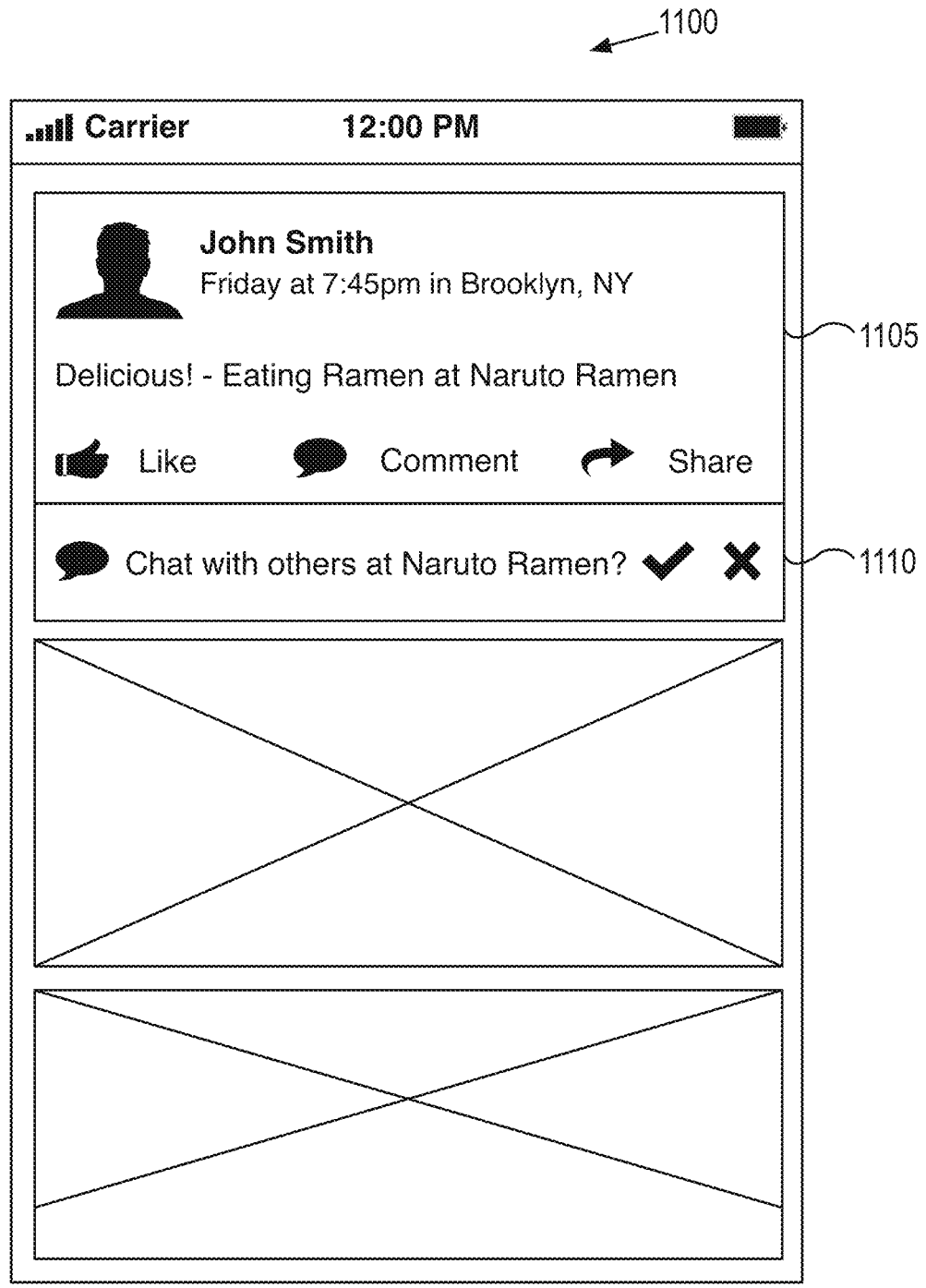
FIG. 11 is an exemplary user interface illustrating a suggested chat conversation based upon the selected location.

FIG. 11 is an exemplary user interface 1100 illustrating a suggested chat conversation 1110 based upon a selected location within content of a post 1105. For example, once the user selects a location for inclusion in a post, the social networking system determines if any existing chats are currently associated with the location. If no existing chats are established, the social networking system initiates a chat with the user as the first user within the chat. As additional users check-in at the location within a threshold period of time or while the user is still present, the additional users are able to join the chat.

Figure 12:
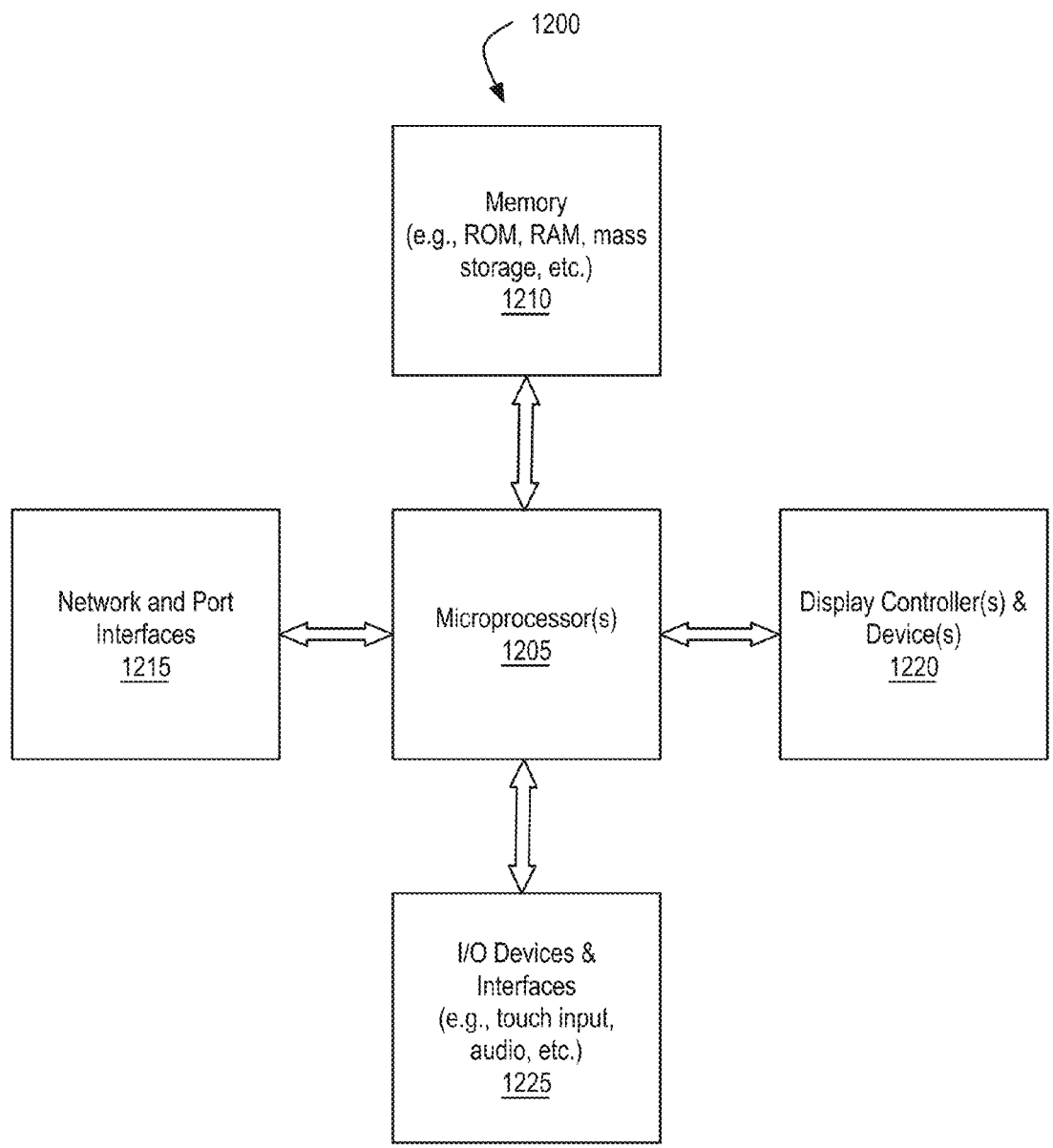
FIG. 12 illustrates, in block diagram form, an exemplary processing system to suggest locations based upon post content.

FIG. 12 illustrates, in block diagram form, exemplary processing system 1200 to suggest locations based upon post content. Data processing system 1200 includes one or more microprocessors 1205 and connected system components (e.g., multiple connected chips). Alternatively, data processing system 1200 is a system on a chip.

Data processing system 1200 includes memory 1210, which is coupled to microprocessor(s) 1205. Memory 1210 may be used for storing data, metadata, and programs for execution by the microprocessor(s) 1205. For example, memory 1210 may include one or more of the data stores 101 and/or may store modules described herein. Memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1210 may be internal or distributed memory.

Data processing system 1200 includes network and port interfaces 1215, such as a port, connector for a dock, or a connector for a USB interface, FireWire, Thunderbolt, Ethernet, Fibre Channel, etc. to connect the system 1200 with another device, external component, or a network. Exemplary network and port interfaces 1215 also include wireless transceivers, such as an I5 802.11 transceiver, an infrared transceiver, a Bluetooth transceiver, a wireless cellular telephony transceiver (e.g., 2G, 3G, 4G, etc.), or another wireless protocol to connect data processing system 1200 with another device, external component, or a network and receive stored instructions, data, tokens, etc.

Data processing system 1200 also includes display controller and display device 1220 and one or more input or output ("I/O") devices and interfaces 1225. Display controller and display device 1220 provides a visual user interface for the user. I/O devices 1225 allow a user to provide input to, receive output from, and otherwise transfer data to and from the system. I/O devices 1225 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 12.

Data processing system 1200 is an exemplary representation of one or more of user device 104, external server 115, and one or more components of social networking system 130, or modules thereof (e.g., location suggestion module 129), described above. Data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1200 may be a network computer, server, or an embedded processing device within another device or consumer electronic product. As used herein, the terms computer, device, system, processing system, processing device, and "apparatus comprising a processing device" may be used interchangeably with data processing system 1200 and include the above-listed exemplary embodiments.

Additional components, not shown, may also be part of data processing system 1200, and, in certain embodiments, fewer components than that shown in FIG. 12 may also be used in data processing system 1200. It will be apparent from this description that aspects of the inventions may be embodied, at least in part, in software. That is, the computer-implemented method 300 may be carried out in a computer system or other data processing system 1200 in response to its processor or processing system 1205 executing sequences of instructions contained in a memory, such as memory 1210 or other non-transitory machine-readable storage medium. The software may further be transmitted or received over a network (not shown) via network interface device 1215. In various embodiments, hardwired circuitry may be used in combination with the software instructions to implement the present embodiments. Thus, the techniques are not limited to any specific combination of hardware circuitry and software, or to any particular source for the instructions executed by data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

As detailed herein, some embodiments of a method; embodiments of a non-transitory computer-readable medium storing instructions which, when executed by one or more processors in a processing device, cause the processing device to perform a method; and embodiments of an apparatus comprising a processing device, wherein the processing device executes instructions that cause the apparatus to perform a method. The methods described herein include receiving input associated with a user account, the input including content to be published on a social networking system; identifying, in response to the received input, one or more location suggestions based upon the content; transmitting, to a user device associated with the user account, the one or more identified location suggestions; receiving selection of one of the location suggestions; and publishing the content and selected location as a post within the social networking system. Additionally, some embodiments of the method further include one or more of: 1) transmitting, to the user device, a composition window including the content and selected location, and receiving a command to publish the content and selected location; 2) the one or more location suggestions being further based upon location data associated with the user device or the user account; 3) the location data including a location previously published in a post by the user account; 4) the location data including a geospatial position of the user device within a window of time when the input is received; 5) the location data including an indication that the user device was stationary at the geospatial position for a threshold period of time; 6) the one or more location suggestions further being based upon positive feedback received by the social networking system with respect to locations; 7) the positive feedback including the social networking system receiving selection of one or more of the locations in response to transmitting the one or more locations as location suggestions; 8) the one or more location suggestions being further based upon a time when the input is received; 9) transmitting, to the user device in response to the received selection of the location, an recommendation to join an online conversation of users of the social networking system that also selected the location; and 10) determining, in response to the received selection of the location, that a user device associated with the user account published a photograph to the social networking system taken within a threshold period of time of the publication of the content and selected location, and transmitting, to the user device, a request to associate the photograph with the location within the social networking system.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   receiving input associated with a user account, the input including content to be published on a communications system, the input not including location data;
   identifying, in response to the received input, one or more location suggestions based upon an action being performed by a user indicated by the input;
   transmitting, to a user device associated with the user account, the one or more identified location suggestions;
   receiving a selection of one of the one or more identified location suggestions; and
   publishing the content and selected location as a post within the communications system.

2. The computer-implemented method of claim 1, further comprising:
   transmitting, to the user device, a composition window including the content and selected location; and
   receiving a command to publish the content and selected location.

3. The computer-implemented method of claim 1, wherein the one or more location suggestions are further based upon the location data associated with the user device or the user account.

4. The computer-implemented method of claim 3, wherein the location data includes a location previously published in a post by the user account.

5. The computer-implemented method of claim 3, wherein the location data includes a geospatial position of the user device within a window of time when the input is received.

6. The computer-implemented method of claim 5, wherein the location data includes an indication that the user device was stationary at the geospatial position for a threshold period of time.

7. The computer-implemented method of claim 1, wherein the one or more location suggestions are further based upon positive feedback received by the communications system with respect to locations.

8. The computer-implemented method of claim 7, wherein the positive feedback includes the communications system receiving selection of one or more of the locations in response to transmitting the one or more locations as location suggestions.

9. The computer-implemented method of claim 1, wherein the one or more location suggestions are further based upon a time when the input is received.

10. The computer-implemented method of claim 1, further comprising:
   transmitting, to the user device in response to the received selection of the location, a recommendation to join an online conversation of users of the communications system that also selected the location.

11. The computer-implemented method of claim 1, further comprising:
   determining, in response to the received selection of the location, that a user device associated with the user account published a photograph to the communications system taken within a threshold period of time of the publication of the content and selected location; and
   transmitting, to the user device, a request to associate the photograph with the location within the communications system.

12. The computer-implemented method of claim 1, wherein identifying the one or more location suggestions further comprises:
   evaluating text of the content to determine a category of location suggestions, the one or more locations suggestions being selected from the determined category of location suggestions.

13. A non-transitory computer-readable medium storing instructions which, when executed by one or more processors in a processing device, cause the processing device to perform a method comprising:
   receiving input associated with a user account, the input including content to be published on a communications system, the input not including location data;
   identifying, in response to the received input, one or more location suggestions based upon an action being performed by a user indicated by the input;
   transmitting, to a user device associated with the user account, the one or more identified location suggestions;
   receiving a selection of one of the one or more identified location suggestions; and
   publishing the content and selected location as a post within the communications system.

14. The non-transitory computer-readable medium of claim 13, the method further comprising:
   transmitting, to the user device, a composition window including the content and selected location; and
   receiving a command to publish the content and selected location.

15. The non-transitory computer-readable medium of claim 13, wherein the one or more location suggestions are further based upon the location data associated with the user device or the user account.

16. The non-transitory computer-readable medium of claim 15, wherein the location data includes a location previously published in a post by the user account.

17. The non-transitory computer-readable medium of claim 15, wherein the location data includes a geospatial position of the user device within a window of time when the input is received.

18. The non-transitory computer-readable medium of claim 17, wherein the location data includes an indication that the user device was stationary at the geospatial position for a threshold period of time.

19. The non-transitory computer-readable medium of claim 13, wherein the one or more location suggestions are further based upon positive feedback received by the communications system with respect to locations.

20. The non-transitory computer-readable medium of claim 19, wherein the positive feedback includes the communications system receiving selection of one or more of the locations in response to transmitting the one or more locations as location suggestions.

21. An apparatus comprising:
   a device comprising a proccesor, wherein the processor executes instructions that cause the apparatus to perform a method comprising:
   receiving input associated with a user account, the input including content to be published on a communications system, the content input not including location data;
   identifying, in response to the received input, one or more location suggestions based upon an action being performed by a user indicated by the content input;
   transmitting, to a user device associated with the user account, the one or more identified location suggestions;
   receiving a selection of one of the one or more identified location suggestions; and
   publishing the content and selected location as a post within the communications system.

* * * * *